T. BRYANT.
BAGGAGE CARRIER.
APPLICATION FILED AUG. 25, 1920.
1,409,437. Patented Mar. 14, 1922.
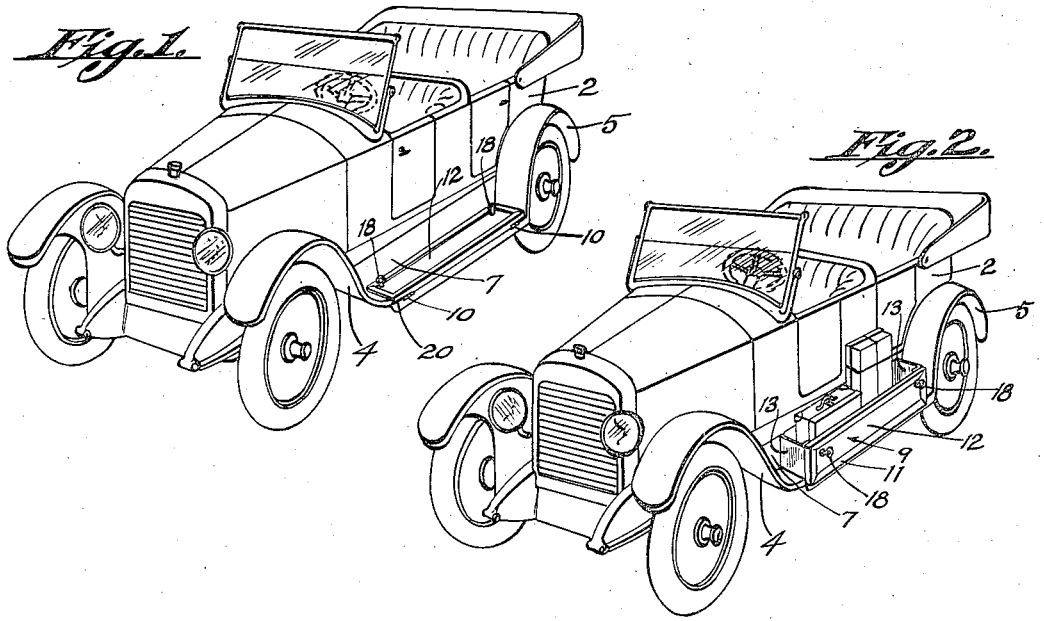
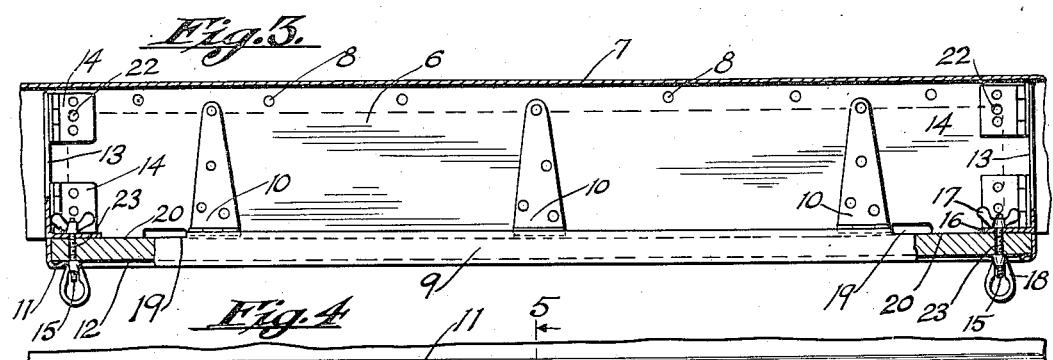
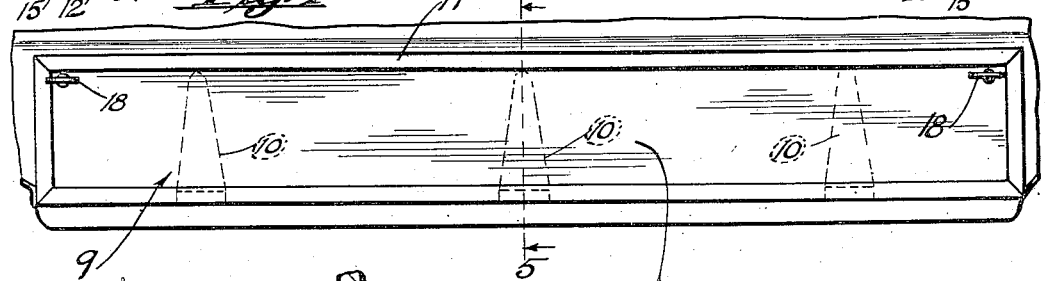
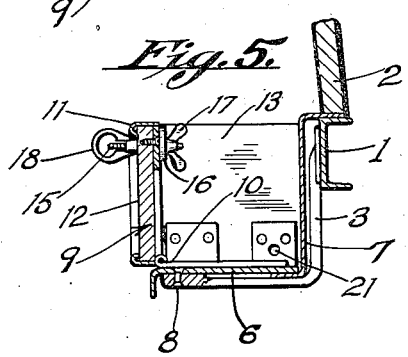
Inventor
THOMAS BRYANT.
By Hazard & Miller
Attorneys.

UNITED STATES PATENT OFFICE.

THOMAS BRYANT, OF SANTA MONICA, CALIFORNIA, ASSIGNOR OF ONE-HALF TO GUSTAVUS S. HOLMES, OF SALT LAKE CITY, UTAH.

BAGGAGE CARRIER.

1,409,437.  Specification of Letters Patent.  Patented Mar. 14, 1922.

Application filed August 25, 1920. Serial No. 405,797.

*To all whom it may concern:*

Be it known that I, THOMAS BRYANT, a citizen of the United States, residing at Santa Monica, in the county of Los Angeles and State of California, have invented new and useful Improvements in Baggage Carriers, of which the following is a specification.

This invention is a baggage carrier adapted to form a part of the running board of a vehicle and arranged to be either unfolded so as to form a box-like receptacle, or folded so as to form a tread surface for the running board.

The invention will be readily understood from the following description of the accompanying drawings, in which—

Figure 1 is a perspective view of an automobile having the improved baggage carrier forming a part of the running board and arranged in folded position.

Fig. 2 is a similar view showing the baggage carrier in unfolded position and in use.

Fig. 3 is a top plan view of the baggage carrier.

Fig. 4 is a front elevation of the same.

Fig. 5 is a transverse section on the line 5—5 of Fig. 4.

In the drawings I have shown an automobile having side channel bars 1 upon which the body frame 2 is mounted. The usual brackets 3 depend from the side channel bars in position to support the running boards of the automobile.

The improved baggage carrier replaces the portion of the base of a running board between the front and rear mud guards 4 and 5. For this purpose the baggage carrier is shown as comprising a base 6 mounted upon bracket 3 and secured at its respective ends to the mud guards 4 and 5. This base at its inner edge overlies the lower edge of the usual upright side 7 of the running board. The parts may be suitably connected as by means of rivets 8.

The front side of the baggage carrier is shown at 9 pivoted at its lower edge as by strap hinges 10 to the front edge of base 6. This front side for the baggage carrier is, preferably, reinforced by the metal strip 11, and the outer surface thereof is arranged to form a usual tread surface 12 for the running board. The front side 9 is of such width that it may be readily folded down upon base 6 when the baggage carrier is not in use.

End members 13 are hinged to the ends of base 6 as by the strap hinges 14, said end members being arranged to be either folded downwardly upon base 6, or arranged in upright position so as to co-operate with front side 9 and the upright side 7 of the running board to form a box-like receptacle in which baggage or the like may be carried.

The front side 9 and the end members 13 may be secured together in upright position forming the baggage carrier by means of bolts 15 extending through suitably alined apertures in front wall 9 and in lugs 16 extending from end members 13 along side the front wall. These bolts may be provided with heads 17 arranged as winged members and with nuts 18 at their opposite ends. The lugs 16 are, preferably, provided upon end members 13 along the side edges thereof adjacent the tops of said end members. Slots 19 are suitably positioned in base 6 to receive these lugs when the end members are swung downwardly into folded position.

The inner surface of the front wall 9 at the ends thereof is, preferably, recessed as shown at 20 in order that the front wall may be folded down upon the downwardly folded end members with said end members received in the recesses of the front wall. The end members and base 6 are, preferably, provided with openings 21—22 arranged in alinement with each other and with the openings 23 in front wall 9 through which bolts 15 extend when the parts are in folded position, in order that said bolts may be received through said alined openings for retaining the parts in their folded position.

It will be observed that the construction as thus described, forms a running board for a vehicle, which when the parts are in unfolded position, provides a baggage carrier, and which when the parts are folded will be out of the way and will form a tread surface for the running board.

Various changes may be made without departing from the spirit of the invention as claimed.

What is claimed is:

A baggage carrier forming a running board for a vehicle and comprising a box-like receptacle, the front side and ends of which are adapted to be folded downwardly upon said running board, and bolts for securing said front side to said ends in unfolded position and adapted to extend through said front side and ends and through the running board when in folded position.

In testimony whereof I have signed my name to this specification.

THOMAS BRYANT.